(12) United States Patent
Hage et al.

(10) Patent No.: US 6,352,677 B1
(45) Date of Patent: Mar. 5, 2002

(54) PROCESS TO PRODUCE COMMERCIAL GRADE ANHYDROUS HYDROGEN FLUORIDE (AHF) AND URANIUM OXIDE FROM THE DELFUORINATION OF URANIUM HEXAFLUORIDE ($UF_6$)

(75) Inventors: Daniel Hage, Paducah, KY (US); Daniel C. Merkel, West Seneca, NY (US); Felton Hulsey, Metropolis, IL (US)

(73) Assignee: Alliedsignal, Inc., Morristown, NJ (US)

( * ) Notice: Subject to any disclaimer, the term of this patent is extended or adjusted under 35 U.S.C. 154(b) by 820 days.

(21) Appl. No.: 08/657,556

(22) Filed: Jun. 4, 1996

(51) Int. Cl.[7] .......................... C01G 43/01; C01G 43/06
(52) U.S. Cl. .................. 423/260; 423/483; 423/488
(58) Field of Search .................. 423/260, 483, 423/488; 264/5

(56) References Cited

U.S. PATENT DOCUMENTS

| | | | | |
|---|---|---|---|---|
| 3,333,930 A | * | 8/1967 | Grant et al. ................ | 423/253 |
| 3,765,844 A | * | 10/1973 | Rode .......................... | 423/19 |
| 3,906,081 A | * | 9/1975 | Welty ......................... | 423/261 |
| 3,978,194 A | * | 8/1976 | Knudsen et al. ............ | 423/261 |
| 4,053,559 A | * | 10/1977 | Hart et al. .................. | 423/261 |
| 4,397,824 A | * | 8/1983 | Butler et al. ............... | 423/260 |
| 4,830,841 A | * | 5/1989 | Urza .......................... | 423/261 |
| 5,066,429 A | * | 11/1991 | Larson et al. .............. | 264/0.5 |
| 5,346,684 A | | 9/1994 | Mestepey | |

* cited by examiner

Primary Examiner—John Hardee

(57) ABSTRACT

The invention relates to a method for recovering products from the defluorination of uranium hexafluoride. Recovered are a commercial grade anhydrous hydrogen fluoride and triuranium oxide through the use of two distinct reactors.

13 Claims, 1 Drawing Sheet

PROCESS TO PRODUCE COMMERCIAL GRADE ANHYDROUS HYDROGEN FLUORIDE (AHF) AND URANIUM OXIDE FROM THE DELFUORINATION OF URANIUM HEXAFLUORIDE ($UF_6$)

The present invention relates generally to a method for recovering products from the defluorination of uranium hexafluoride. More particularly, the present invention relates to the recovery of commercial grade liquid anhydrous hydrogen fluoride and water insoluble stable triuranium octoxide.

BACKGROUND OF THE INVENTION

Commercially useful uranium isotopes such as $U^{235}$ have been produced in well known processes for over 40 years. The feed material for these processes have been produced from a uranium hexafluoride (UF6) enrichment process which takes natural uranium, which contains 0.7% $U^{235}$, to suitable levels for nuclear fuel. The enrichment process leaves behind a $UF_6$ material that contains mostly $U^{238}$ and 0.1–0.3% $U^{235}$. The material is referred to as depleted $UF_6$ ($DUF_6$) and as of yet has little commercial value although there is hope in the future that new enrichment technologies will allow for more of the $U^{235}$ to be removed from the $DUF_6$ essentially turning it into a resource.

The $DUF_6$ that has been produced for the last 40 years is stored in carbon steel cylinders and amounts to around 50,000 cylinders or over 1 billion pounds of material. Storage of these cylinders is not considered a long term solution because of the potential for corrosion to the cylinders which could cause a release of the material into the environment. $UF_6$ reacts readily with the moisture in the air to form hydrofluoric acid and water soluble uranyl fluoride ($UO_2F_2$). It is looked upon as a potential safety and environmental hazard. It is therefore desirable to have a cost effective process which can convert the $DUF_6$ into its most stable insoluble form uranium oxide ($U_3O_8$). In addition, the process will create virtually no waste while recovering the hydrogen fluoride (HF) values of the $DUF_6$.

While others have practiced the chemical equations mentioned in the present invention, (U.S. Pat. No. 5,346,648) no one has succeeded in putting together a complete process, or achieved the objectives of the present invention in the manner in which those objectives are achieved by the present invention. The present invention has fulfilled a long felt need for recovering commercially useful anhydrous hydrogen fluoride (AHF) from uranium hexafluoride ($UF_6$). Furthermore the method of the present invention produces a stable insoluble uranium oxide, $U_3O_8$, that is less toxic than $UF_6$ and can be stored for future use, disposed of in a low radiation level burial site at minimal cost, or used in current shielding applications.

While the method in U.S. Pat. No. 5,346,648 appears similar to the present invention, the present invention uses a liquid phase first reactor. Because of this it has numerous advantages over its predecessor. The present invention can be run at low temperatures and pressures. It can therefore use less expensive materials of construction than the super alloys required to withstand the high temperatures described in U.S. Pat. No. 5,346,648. The present invention is easier to control than its predecessor by nature of maintaining water in excess. The only feeds to the process are $UF_6$ vapor and a small water makeup stream in the form of aqueous HF that is mixed into the internal recycle stream. It is safer to run than the method of U.S. Pat. No. 5,346,648 because it is run at low temperatures and pressures. Still another improvement is the intermediate uranyl fluoride hydrate that is made in present invention's liquid phase reactor which is different than the uranyl fluoride intermediate made in its predecessor. Many other improvements exist and are realized.

SUMMARY OF THE INVENTION

The present invention is a method for recovering two distinct and separable products from the defluorination of uranium hexafluoride. The first product is a commercial grade liquid anhydrous hydrogen fluoride (AHF). The second is water insoluble uranium oxide such as uranium dioxide ($UO_2$), uranium trioxide ($UO_3$) and preferably, stable triuranium octoxide ($U_3O_8$) which can be stored safely for future use or disposed of in a conventional manner. A liquid recycle stream consisting of the azeotrope of water and hydrogen fluoride also exists and is used as a feed stock to the primary and or secondary reactor. The present method produces a commercially valuable material while reducing the amount of hazardous material that needs to be stored or disposed of in addition to making it less of a safety and environmental concern.

The method includes a primary reactor which is a reservoir, pump tank/settler/vaporizer around which a stream of an aqueous hydrogen fluoride solution circulates. A gaseous stream of uranium hexafluoride ($UF_6$) is introduced into the circulating solution. The $UF_6$ reacts with some of the excess water in the circulating stream producing a uranyl fluoride intermediate ($UO_2F_2.H_2O$) and HF which dissolve in the solution. When the resulting solution has been saturated with $UO_2F_2.H_2O$ solid, the uranyl fluoride intermediate begins to precipitate out of solution and settles out at the bottom of the pump tank (settler). As water is reacted away and HF is evolved the resulting solution becomes more and more concentrated in HF and the resulting vapor is high in HF concentration. By controlling the temperature of the solution in the pump tank, HF rich vapor and water vapor essentially free of uranium can be condensed and fed into a conventional distillation column.

The solid uranyl fluoride intermediate produced is fed to a secondary reactor and reacted with water vapor to produce a uranium oxide product such as triuranium octoxide product and a gaseous mixture of water, hydrogen fluoride, and oxygen. This gaseous mixture is combined with the gaseous mixture of water and hydrogen fluoride from the primary reactor, condensed and subsequently fed into the conventional distillation column. The components are separated in a distillation column to obtain a commercial grade anhydrous hydrogen fluoride product stream overhead and an aqueous azeotropic recycle stream containing water and hydrogen fluoride. The azeotrope composition recycle stream is returned in part or in its entirety to the primary reactor as a water makeup to the system. The recycle stream can also be vaporized and combined with a small amount of makeup steam and used as a water feed source to the second reactor.

Hydrogen gas may be used in place of water as a feed to the secondary reactor with the resulting stream of HF and hydrogen $$UO_2F_2.H_2O+H_2 \rightarrow U_3O_8+HF+H_2$$

gas (small amount) being combined with the HF rich vapor from the primary reactor, condensed and fed into the conventional distillation column. In this case makeup water will need to be fed to the primary reactor.

A third reactor may be added that would act as a fluoride stripper for soluble fluorine in the triuranium octoxide product. Solid triuranium octoxide material is fed to the reactor and contacted with steam. If the third reactor is added any makeup water that is needed for the entire system is fed to it. The resulting mixture of steam with a very slight amount of HF is fed directly into the second reactor or should a hydrogen feed be selected as a reactant in the second reactor the steam and HF mixture would be condensed and fed to the primary reactor as makeup water.

DETAILED DESCRIPTION OF THE PREFERRED EMBODIMENTS

Figure 1:
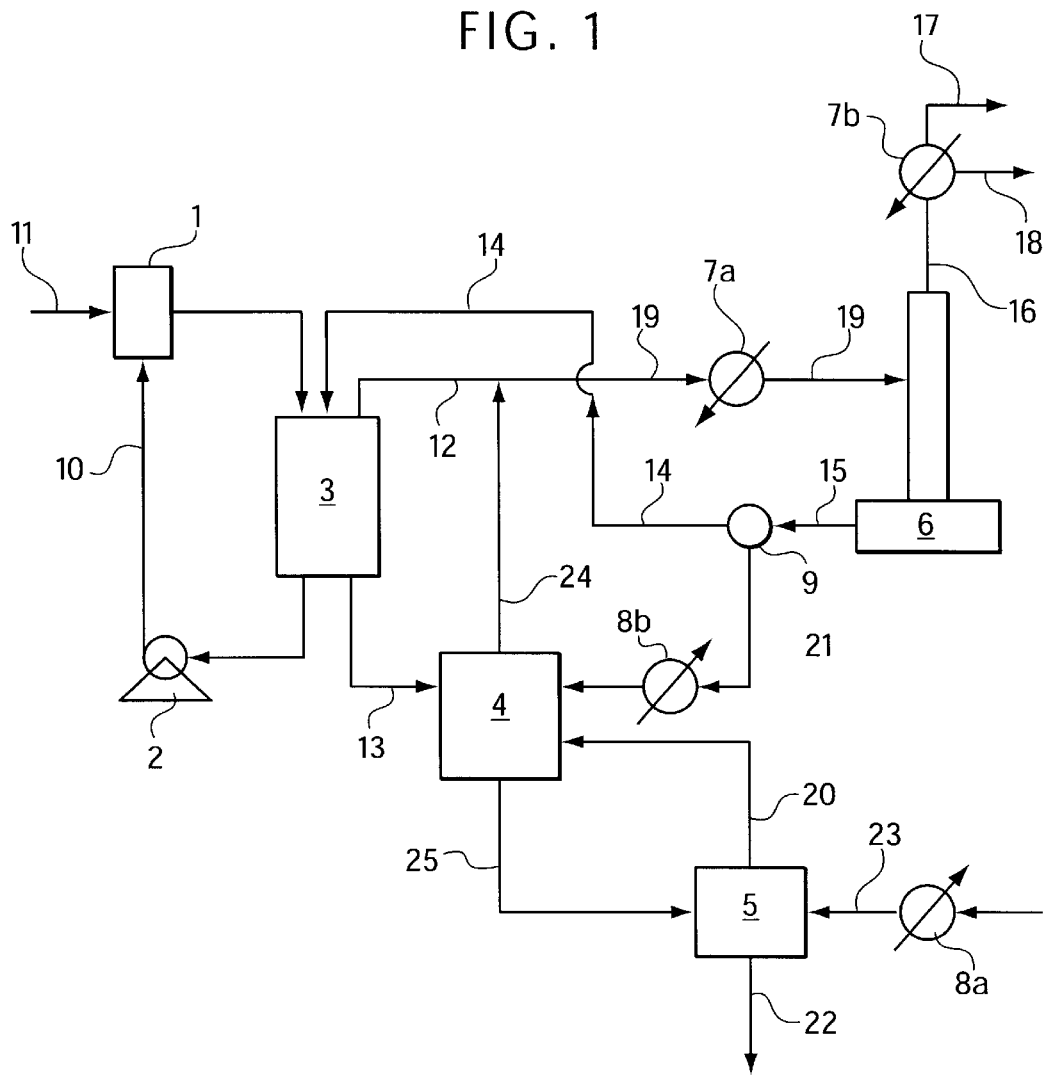
FIG. 1 is a schematic flowchart of the method of the present invention.

With reference to FIG. 1, the units of operation include a first reactor 1, a circulation pump 2, a pump/settling tank/vaporizer 3, a second reactor 4, a fluorine stripper 5, a separation unit 6, two condensers 7a and 7b, two vaporizers 8a and 8b, and a transfer pump 9. The material streams defined by the method are designated 10–25 and are further described with reference thereto. The pump/settling tank 3 is initially charged with a liquid hydrogen fluoride (HF) and water solution in the range of 37% to 65% HF. The solution is circulated around a closed loop (stream 10) through the first reactor 1. The solution is initially heated by an external source in pump/settling tank 3 close to its boiling point. The actual temperature depends on the concentration of HF in the solution, but in the range of 78–115° C. Feed stream 11, comprised of gaseous uranium hexafluoride ($UF_6$), is fed into the first reactor 1 and contacts stream 10. The $UF_6$ reacts with some of the excess water in circulating stream 10 to produce a uranyl fluoride hydrate ($UO_2F_2 \cdot H_2O$) intermediate and HF which initially dissolve in the solution by the following reaction equation (1):

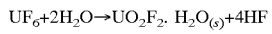

$$UF_6 + 2H_2O \rightarrow UO_2F_2 \cdot H_2O_{(s)} + 4HF$$

As the UF6 feed process continues the HF content of the solution increases and the solubility limit of $UO_2F_2 \cdot H_2O$ is reached and solid $UO_2F_2 \cdot H_2O$ precipitates out of solution and settles to the bottom of pump/settling tank 3. As water is reacted away and HF is evolved the concentration of HF in the solution increases and the solution will begin to boil producing a HF rich vapor stream 12 comprised of between a ratio of 37.7/62.3% HF/water and make up stream 14 up to >98/<2% HF/water depending on the vapor/liquid equilibrium of the HF solution at its boiling point.

First reactor 1 and pump/settling tank 3 are kept at a pressure of 1–5 psig and a temperature dependent on the boiling point of the HF solution contained therein. The temperature is set thereby controlling the composition of vapor stream 12. The solubility of $UO_2F_2 \cdot H_2O$ is dependent upon the concentration of HF in the solution. 6.6 weight % $UO_2F_2 \cdot H_2O$ was the observed solubility in a solution containing 38.22% HF at ambient temperature and 4.34 weight % $UO_2F_2 \cdot H_2O$ was found to be soluble in a 52.4% HF solution at ambient temperature.

Two outlet streams 12 and 13 are recovered separately from the pump/settling tank 3. Stream 13 is comprised of a slurry of solid $UO_2F_2 \cdot H_2O$ and HF/water/ $UO_2F_2 \cdot H_2O$ solution that is fed into second reactor 4. The HF and water in the stream are boiled off as it enters the hot second reactor essentially drying the solids. Some reaction does occur between the water and $UO_2F_2$, but it is incomplete so steam (stream 20) is also fed to second reactor 4 in a stoichiometric excess to the amount of $UO_2F_2 \cdot H_2O$ in stream 13 and preferably at an excess of from about 200 to 500%. The steam finishes the reaction of the $UO_2F_2 \cdot H_2O$ in second reactor 4 which is maintained at a temperature of 427–704° C. and preferably between 538 and 649° C. Second reactor 4 is maintained at a pressure between about 0–5 psig and preferably between about 2–4 psig.

The reaction products of water and uranyl fluoride leave second reactor 4 separately as stream 24 and 25 which are characterized by the following generalized reaction equation (2):

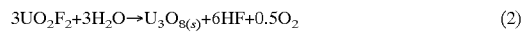

$$3UO_2F_2 + 3H_2O \rightarrow U_3O_{8(s)} + 6HF + 0.5O_2 \qquad (2)$$

As indicated by equation (2), outlet stream 25 comprises solid triuranium octoxide ($U_3O_8$) product with a less than 200 ppm soluble (unreacted) fluoride content and outlet stream 24 comprises a gaseous mixture of water, HF, and oxygen. The $U_3O_8$ of stream 25 is fed to a fluorine stripper 5 if it does not meet the specification for concentration of soluble fluorides. Water fed into vaporizer 8a is turned into steam (stream 23) and is fed into fluorine stripper 5 in a large stoichiometric excess from about 200 to 500% of the amount of $UO_2F_2 \cdot H_2O$ in stream 25. Two separate outlet streams, 20 and 22, leave fluoride stripper 5. Product stream 22 comprises triuranium octoxide product with a less than 25 ppm soluble fluoride concentration and is isolated from the process for storage or disposal. Stream 20, comprised of essentially steam, becomes a feed stream to second reactor 4. If fluorine stripper 5 is not necessary stream 23 and stream 20 are the same, as are stream 25 and 22.

As a variation, stream 13 is reacted with hydrogen gas instead of steam or HF/water azeotrope as a water source in second reactor 4. Stream 20 becomes hydrogen. In that case the outlet streams 24 and 25 are characterized by the generalized equations (3) and (4).

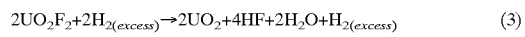

$$2UO_2F_2 + 2H_{2(excess)} \rightarrow 2UO_2 + 4HF + 2H_2O + H_{2(excess)} \qquad (3)$$

$$3UO_2 + O_2 \rightarrow U_3O_8 \qquad (4)$$

Outlet stream 25, comprised of $UO_2$ is unstable at elevated temperatures and reacts to the triuranium octoxide when exposed to air after second reactor 4. If hydrogen is used as the feed and the fluorine stripper 5 is necessary then the stream outlet of fluorine stripper 5 goes to pump/settling tank 3 as the water makeup for the system.

First reactor 1 and second reactor 4 outlet streams 12 and 24 respectively are combined before condenser 7a to form stream 19 comprised of a gaseous mixture of HF/water/oxygen and in some cases $H_2$. Stream 19 is cooled as it passes through condenser 7a and depending on the temperature and pressure conditions of stream 19 it may be entirely in a liquid state, but more than likely it will be in two states, a gaseous state comprised mainly of oxygen and a liquid state comprised of HF and water. Stream 19 becomes a feed to separation unit 6. It is further understood that streams 12 and 24 may not be combined before separation unit 6, but may be mixed inside separation unit 6 internally without the use of condenser 7a.

Regardless, separation unit 6 is a distillation column wherein stream 19 is separated into two separate streams 15 and 16. Stream 16 is a gaseous mixture of HF and oxygen essentially free of water and uranium. Outlet stream 16 is subsequently fed to condenser 7b from which a gaseous stream 17 comprised essentially of oxygen, which will be vented to a scrubber and a liquid stream 18 composed of commercial grade anhydrous hydrogen fluoride with less than 1 ppm uranium and less than 500 ppm water which is packaged for transfer to customer end use. Outlet stream 15 is a liquid stream comprised of about 37% HF and about 63% water which is the azeotrope composition of HF/water and is used in its entirety or in part as recycle feed to first reactor 1 and second reactor 4. Transfer pump 9 moves stream 15 after which stream 15 is split into recycle streams 14 and 21. Stream 14 is recycled as a liquid to first reactor 1 to keep a constant level and desired HF concentration in first reactor 1. Stream 21 is vaporized and recycled back and used as a substitute or supplement to feed stream 20 into second reactor 4. After the recycle streams 14 and 21 are going the amount of water makeup to the entire system in the form of stream 23 is adjusted to keep the system at steady-state operation or in other words the stoichiometric amount needed to react with the $UF_6$ feed from stream 11.

The following examples demonstrate the practice and utility of the present invention, but are not to be construed as limiting the scope thereof.

EXAMPLES

Example 1

Example 1 is an example of the first reactor starting with a 38.92% HF solution. 3038.8 grams of an 38.92% HF/water solution were originally charged to a 3.7 liter vessel used as the pump/settling tank. A small diaphragm pump circulated the solution around a closed loop system and past a nozzle located inside a mixing tee which acted as the reactor. A $UF_6$ feed cylinder was prepared and placed on a scale. An inert gas, nitrogen ($N_2$), purge was flowing through the $UF_6$ feed line, out the nozzle and into the circulating HF solution to keep the nozzle free of moisture. The $UF_6$ feed was turned on and co-fed with the nitrogen. The nitrogen purge was decreased over time until it was completely turned off. A solution 38.92% HF, was added during the experiment totaling 621.2 grams. A total of 853.6 grams of $UF_6$ was fed to the reactor system. $UO_2F_2$/HF/water slurry material were drained out of the pump/settling tank periodically during the experiment. The reactor was kept at atmospheric pressure during the run by venting the vessel through a brine condenser. Any vapors that passed from the brine condenser were captured in an absorber filled with potassium hydroxide (KOH) solution of strength 27.30% KOH. After the run the resulting material in the reactor system, the caustic absorber, and the $UO_2F_2$/HF/water slurry collected during the run were analyzed and a detailed mass balance on HF, water, and $UO_2F_2$ was performed. Results indicated that 99.06% of the theoretical amount of HF was collected, 98.58% of the $UO_2F_2$ was accounted for and 91.71% of the water was accounted for. The $UO_2F_2$ was analyzed for purity by testing it for % soluble fluorides. Since $UO_2F_2$ is soluble in water the analysis for soluble fluorides is a good test to check its purity. An unexpected discovery was made using this analysis. The amount of soluble fluoride in the sample was found to be 11.50% and the amount of soluble fluoride in pure $UO_2F_2$ is 12.34%. The amount of soluble fluoride in a $UO_2F_2$ hydrate however is 11.62%. It was discovered that a hydrated $UO_2F_2 \cdot H_2O$ material is made when $UF_6$ reacts with water in the liquid form. See Table 1 for results.

Example 2

Example 2 is a demonstration of the second reactor starting with some of the slurry material collected from Example 1. Four experiments numbered 26–29 were conducted using a 2″ diameter MONEL muffle reactor with an external electric heating source. For each experiment a monel container was filled with about 9–10 grams of the $UO_2F_2 \cdot H_2O$/HF/water slurry material. The composition of the slurry was 28.83% $UO_2F_2 \cdot H_2O$, 32.83% HF, and 38.34% water. The boats were placed in the muffle reactor and heated to 649° C. for 15–30 minutes. The reactor was kept at atmospheric pressure by venting the reactor to a caustic absorber. A slight 20 cc/min nitrogen purge was put on the reactor. The % conversion is found by analyzing the material for soluble fluorides since $UO_2F_2$ dissolves in water and the triuranyl octoxide product does not. The results found in Table 2 show that the conversion of $UO_2F_2$ to $U_3O_8$ was from about 58.8 to about 64% indicating that the HF and water had boiled off before the reaction was complete as the material left behind was dry. An additional source of water in the form of steam or HF/water azeotrope was fed to the second reactor to complete the reaction. See Table 2 for results.

Example 3

Example 3 is a demonstration of the second reactor using pre-dried $UO_2F_2 \cdot H_2O$ obtained from the experiment in example 1 and reacted to completion with a steam feed. Pre-dried $UO_2F_2 \cdot H_2O$ was obtained from the slurry material from Example 1 by putting a sample of the slurry in a platinum dish and drying it under a UV lamp. 43.6727 grams of slurry were placed in a platinum dish and dried over night. 12.5293 grams or 28.69% of the original material was left in the dish. It was analyzed for soluble fluorine and had 11.50% which is the amount found in a $UO_2F_2$ hydrate, namely $UO_2F_2 \cdot H_2O$. Eight experiments numbered 16-S-23S were run using the same reactor setup as above. Temperatures of 538 and 649° C. were used at different residence times and excess water amounts. All the experiments ran at 649° C. showed greater than 99.9% conversion of $UO_2F_2$ to $U_3O_8$ with only about 20.6 ppm to 87.6 ppm soluble fluoride left in the product. The experiments using 538° C. temperatures ranged from about 57 to about 90% conversion. See Table 3 for results.

Example 4

Example 4 is a demonstration of the second reactor using HF/water azeotrope as a water source instead of steam with pre-dried $UO_2F_2 \cdot H_2O$ obtained from the experiment in Example 1. One experiment numbered 33-A was run using the same reactor setup as Example 3. A temperature of 649° C. was chosen. The experiment showed greater than 99.9% conversion of $UO_2F_2$ to $U_3O_8$ with about 2.23% soluble fluoride left in the product. See Table 4 for results.

Example 5

Example 5 is a demonstration of the second reactor using hydrogen to reduce the $UO_2F_2$ to $U_3O_8$ with pre-dried $UO_2F_2 \cdot H_2O$ obtained from the experiment in example 1 and reacted to completion. One experiment numbered 25-H was run using the same reactor setup as above. A temperature of 649° C. was chosen and a 100 cc/min hydrogen feed with a 100 cc/min nitrogen (inert gas) co-feed was used. The experiment showed greater than 99.9% conversion of $UO_2F_2$ to $U_3O_8$ with less than 100 ppm soluble fluoride left in the product. See Table 5 for results.

Example 6

Example 6 is an example of the first reactor starting with a 64.73% HF solution. It demonstrates the first reactor with a high concentration of HF and the composition of the vapor that can be expected when the $UF_6$ feed is on. It is also an excellent demonstration of a flash distillation of the pump/ settling tank contents. 3202.9 grams of an 64.73% HF/water solution were originally charged to a vessel used as the pump/settling tank. The solution was heated to its boiling point of about 78° C. A brine condenser was attached to the vapor port on the top of the vessel. The noncondensibles were vented from the vessel through the brine condenser until the vessel vapors comprised of HF/water were condensing and refluxing back into the tank. A small diaphragm pump circulated the solution around a closed loop system and past a nozzle located inside a mixing tee which acted as the reactor. A $UF_6$ feed cylinder was prepared and placed on a scale. An inert gas, $N_2$, was flowing through the $UF_6$ feed line, out the nozzle and into the circulating HF solution to keep the nozzle free of moisture. The $UF_6$ feed was turned on and co-fed with the nitrogen. The nitrogen purge was decreased over time until it was completely turned off. Initially enough UF6 was fed to saturate the HF solution with $UO_2F_2$. The $UF_6$ feed was stopped and a flash distillation was done on the saturated solution. A total of four reflux samples were taken and analyzed for %HF and concentration of uranium. They showed greater than 98% HF and between about 0.33 and 2.15 ppm uranium after reaching steady state.

The $UF_6$ feed was resumed using a slight, 0–130 cc/min, co-feed of nitrogen. During the time that $UF_6$ was being fed a total of four vapor reflux samples and analyzed for %HF and concentration of uranium. The feed rate of $UF_6$ was varied for each sample. The %HF ranged from about 93% to about 99%. The uranium concentration ranged from about 0.58 ppm to about 240 ppm.

A total of 392.9 grams of $UF_6$ was fed to the reactor system. The reactor was kept at atmospheric pressure during the run by venting the vessel through a brine condenser. Any vapors that escaped from the brine condenser were captured in a startup absorber filled with potassium hydroxide (KOH) solution of strength 20.53% KOH or a parallel run absorber filled with Distilled and Deionized water. After the run the resulting material in the reactor system, each absorber, and all samples collected during the run were analyzed and a detailed mass balance on HF, water, and $UO_2F_2$ was done. Results indicated that 98.24% of the theoretical amount of HF was collected, 95.16% of the $UO_2F_2$ was accounted for and 96.64% of the water was accounted for. Results of these experiments are summarized in Table 6.

Example 7

Example 7 demonstrated that a distillation column could make anhydrous hydrogen fluoride that was within existing commercial grade specifications for uranium. A distillation column was constructed consisting of a vessel with external electric heating source for a reboiler, a column packed with Kynar mesh packing, and a tube in tube condenser. The theoretical plates were calculated to be 10.6.

The results of vapor reflux samples taken from Example 7 were used to synthesize a representative reboiler charge. The charge consisted of 0.0958 grams of $UO_2F_2$ added to 1481.6 grams of 64.73% HF solution to make up a reboiler charge with a 50 ppm uranium concentration.

The reboiler was heated to 79–80° C. until the reboiler contents boiled. The noncondensibles were vented off the top of the condenser through the brine condenser until a liquid reflux was established. The column pressure was kept at atmospheric pressure. After 1.25 hours a sample of the reflux liquid was taken and analyzed for HF concentration (by titration) and uranium content (by ICP-MS). The sample was high in uranium concentration as the column had not come to equilibrium yet. It was already seen that the distillation would work because of the results of the flash distillation experiment done earlier with a saturated (4.34% $UO_2F_2$) 65% HF solution in example 6. Samples were taken periodically and analyzed for both HF concentration and U until the 1 ppm U spec was satisfied. Sample 4 had a 0.76 ppm U concentration. All samples taken were greater than 99% HF. Results of these experiments are summarized in Table 7.

TABLE 1

1st Reactor Mass Balance

IN 3670 total gms   38.92% HF solution
1428.4 grams of HF from starting and make-up solutions
2241.6 grams of $H_2O$ from starting and make-up solutions
853.5 total grams of $UF_6$ fed Theoretical amount of $UO_2F_2$ and HF produced

|  | $UF_6$ | + | $2H_2O$ | -> | $UO_2F_2$ | + | 4HF |
|---|---|---|---|---|---|---|---|
| Moles | 2.4 |  | 4.8 |  | 2.4 |  | 9.7 |
| Grams | 853.5 |  | 97.0 |  | 746.8 |  | 194.0 |

1622.3 total grams of HF IN
2144.6 total grams of water IN

OUT

Total Out
1607.1 grams HF
 736.2 grams $UO_2F_2$
1966.8 grams $H_2O$
Mass Balance Calculation

| HF | 1607.1/1622.3*100 = | 99.06% |
| $UO_2F_2$ | 736.2/746.8*100 = | 98.58% |
| $H_2O$ | 1966.9/2144.6*100 = | 91.71% |

Analysis of $UO_2F_2$ product shows a soluble fluoride content of 11.50% $F^-$. This is a $UO_2F_2$ hydrate because pure $UO_2F_2$ has 12.34% soluble $F^-$ and $UO_2F_2.H2O$ has 11.62% soluble $F^-$.

TABLE 2

2nd Reactor Pyrohydrolysis of $UO_2F_2.H_2O$/HF/$H_2O$ Slurry

Purpose is to see if the slurry from the liquid phase reactor will react to completion without additional water feed.
$3UO_2F_2 + 3H_2O \rightarrow U_3O_8 + 6HF + 1/2O_2$

| EXP # | Act. slurry wt. (gm) | Residence Time (min) | Temp. ° C. Actual (Ave.) | * Soluble $F^-$ in product % | % Conv. of $UO_2F_2$ |
|---|---|---|---|---|---|
| 26 | 8.9524 | 30 | 645 | 4.42% | 64.2 |
| 27 | 9.5387 | 30 | 654 | 5.08% | 58.8 |
| 28 | 9.2622 | 30 | 653 | 4.40% | 64.3 |
| 29 | 9.2891 | 30 | 653 | 4.68% | 62.1 |

The starting material was from the 1st reactor with a starting HF solution of 38.92% strength from Example 1. The uranium compound, by soluble $F^-$ analysis, appears to be a $UO_2F_2.H_2O$ hydrate.
* Note:
Starting $UO_2F_2.H_2O$ hydrate had 11.50% soluble $F^-$ by the same analytical method. Pure $UO_2F_2.H_2O$ has 11.65% soluble $F^-$.

TABLE 3

Design of Experiments for 2nd Reactor Pyrohydrolysis
Steam Feed

| DESIGN EXP # | Amount $UO_2F_2$ (gms) | Temp (° C.) | Residence Time (min) | Feed rate (g/min) | Amount of Steam feed (gms) | % Excess $H_2O$ |
|---|---|---|---|---|---|---|
| 16-S | 4.0 | 649 | 15 | 0.33 | 5 | 2038.9 |
| 17-S | 4.0 | 649 | 15 | 1.00 | 15 | 6316.7 |
| 18-S | 4.0 | 649 | 30 | 0.17 | 5 | 2038.9 |
| 19-S | 4.0 | 649 | 30 | 0.50 | 15 | 6316.7 |
| 20-S | 4.0 | 538 | 15 | 0.33 | 5 | 2038.9 |
| 21-S | 4.0 | 538 | 15 | 1.00 | 15 | 6316.7 |
| 22-S | 4.0 | 538 | 30 | 0.17 | 5 | 2038.9 |
| 23-S | 4.0 | 538 | 30 | 0.50 | 15 | 6316.7 |

$3UO_2F_2 + 3H_2O \rightarrow U_3O_8 + 6HF + \frac{1}{2}O_2$

| ACTUAL EXP # | Act. $UO_2F_2$ wt. (gm) | $UO_2F_2$ moles | $H_2O$ needed wt. (gm) Theory | $U_3O_8$ moles Theory | $U_3O_8$ wt. (gm) Theory | $U_3O_8$ wt. (gm) Actual | % Conv. of $UO_2F_2$ | $H_2O$ Feed wt. (gm) Actual | % excess $H_2O$ | Temp. ° C. Actual (Ave.) | *Soluble F in product ppm or % |
|---|---|---|---|---|---|---|---|---|---|---|---|
| 16-S | 3.9998 | 0.0130 | 0.2338 | 0.0043 | 3.6448 | 3.6774 | 99.99 | 5 | 2039 | 645 | <75 |
| 17-S | 4.0002 | 0.0130 | 0.2338 | 0.0043 | 3.6452 | 3.6569 | 99.99 | 15 | 6316 | 654 | <25 |
| 18-S | 4.0002 | 0.0130 | 0.2338 | 0.0043 | 3.6452 | 3.6812 | 99.99 | 5 | 2039 | 653 | <90 |
| 19-S | 4.0000 | 0.0130 | 0.2338 | 0.0043 | 3.6450 | 3.6642 | 99.99 | 15 | 6317 | 653 | <25 |
| 20-S | 4.0002 | 0.0130 | 0.2338 | 0.0043 | 3.6452 | 3.8676 | 53.79 | 5 | 2039 | 543 | 5.31% |
| 21-S | 3.9999 | 0.0130 | 0.2338 | 0.0043 | 3.6449 | 3.8177 | 65.54 | 15 | 6317 | 534 | 3.96% |
| 22-S | 3.9999 | 0.0130 | 0.2338 | 0.0043 | 3.6449 | 3.8539 | 53.70 | 5 | 2039 | 541 | 5.32% |
| 23-S | 4.0002 | 0.0130 | 0.2338 | 0.0043 | 3.6452 | 3.7163 | 89.08 | 15 | 6316 | 539 | 1.26% |

The starting material was from the 1st reactor with a starting HF solution of 38.92% strength from Example 1.
The uranium compound, by soluble $F^-$ analysis, appears to be a $UO_2F_2 \cdot H_2O$ hydrate.
*Note:
Starting $UO_2F_2 \cdot H_2O$ hydrate had 11.50% soluble $F^-$ by the same analytical method. Pure $UO_2F_2 \cdot H_2O$ has 11.65% soluble $F^-$.

TABLE 4

1st Reactor Material Pyrohydrolysis using HF/water Azeotrope as a Water Source
HF/water azeo feed

| DESIGN EXP # | Amount $UO_2F_2$ | Temp (° C.) | Residence Time (min) | Feed rate (g/min) | Amount of Steam feed (gms) | % Excess $H_2O$ |
|---|---|---|---|---|---|---|
| 33-A | 4.0 | 649 | 60 | 0.50 | 30 | 12733.3 |

$3UO_2F_2 + 3H_2O \rightarrow U_3O_8 + 6HF + \frac{1}{2}O_2$

| ACTUAL EXP # | Act. $UO_2F_2$ wt. (gm) | $UO_2F_2$ moles | $H_2O$ needed wt. (gm) Theory | $U_3O_8$ moles Theory | $U_3O_8$ wt. (gm) Theory | $U_3O_8$ wt. (gm) Actual | % Conv. of $UO_2F_2$ | $H_2O$ Feed wt. (gm) Actual | % excess $H_2O$ | Temp. ° C. Actual (Ave.) | *Soluble F in product ppm or % |
|---|---|---|---|---|---|---|---|---|---|---|---|
| 33-A | 4.1530 | 0.0135 | 0.2427 | 0.0045 | 3.7844 | 3.9601 | 81.93 | 35 | 14321 | 649 | 2.23% |

The starting material was from the 1st reactor with a starting HF solution of 38.92% strength from Example 1.
The uranium compound, by soluble $F^-$ analysis, appears to be a $UO_2F_2 \cdot H_2O$ hydrate.
*Note:
Starting $UO_2F_2 \cdot H_2O$ hydrate had 11.50% soluble $F^-$ by the same analytical method. Pure $UO_2F_2 \cdot H_2O$ has 11.65% soluble $F^-$.

TABLE 5

2nd Reactor Pyrohydrolysis Reactions of $UO_2F_2$
$H_2$ feed $2UO_2F_2 \cdot H_2O + 2H_2 \rightarrow 2UO_2 + 4HF + 2H_2O$
$3UO_2 + O_2 \rightarrow U_3O_8$

| DESIGN EXP # | Amount $UO_2F_2$ | Temp (° C.) | Residence Time (min) | Nitrogen Feed rate (cc min) | Hydrogen Feed rate (cc/min) |
|---|---|---|---|---|---|
| 25-H | 4.0 | 649 | 30 | 100 | 100 |

TABLE 5-continued

2nd Reactor Pyrohydrolysis Reactions of $UO_2F_2$
$H_2$ feed

| ACTUAL EXP # | Actual $UO_2F_2.H_2O$ wt. (gm) | $UO_2F_2$ moles | $H_2$ needed wt. (gm) Theory | $U_3O_8$ moles Theory | $U_3O_8$ wt. (gm) Theory | [1] $U_3O_8$ wt. (gm) Actual | % Conv. of $UO_2F_2$ | $H_2$ feed amount (g) Actual | % excess $H_2$ feed | Temp. ° C. Actual (Ave.) | *Soluble F in product ppm |
|---|---|---|---|---|---|---|---|---|---|---|---|
| 25-H | 4.0009 | 0.0126 | 0.0252 | 0.0042 | 3.5312 | 3.5581 | 99.99 | 4.65 | 18384 | 649 | <100 |

The starting material was from the 1st reactor with a starting HF solution of 38.92% strength from Example 1.
The uranium compound, by soluble $F^-$ analysis, appears to be a $UO_2F_2.H_2O$ hydrate.
*Note:
Starting $UO_2F_2.H_2O$ hydrate had 11.50% soluble $F^-$ by the same analytical method. Pure $UO_2F_2.H_2O$ has 11.65% soluble $F^-$.
[1] The color of the product was a uniform deep olive green.

TABLE 6

1st Reactor Mass Balance

1st reactor was run with a starting HF solution concentration of 64.73% HF.

IN 3202.9 grams of 64.73% HF solution
1129.7 grams of $H_2O$ from starting solution
2073.2 grams of HF from starting solution
392.9 total grams of $UF_6$ fed
  Theoretical amount of $UO_2F_2$ and HF produced

|  | $UF_6$ | + | $2H_2O$ | -> | $UO_2F_2$ | + | 4HF |
|---|---|---|---|---|---|---|---|
| Moles | 1.12 |  | 2.23 |  | 1.12 |  | 4.46 |
| Grams | 392.9 |  | 44.6 |  | 343.8 |  | 89.3 |

2162.5 total grams of HF IN
1085.0 total grams of $H_2O$ IN
OUT

Total Out
2124.38 grams HF
 327.15 grams $UO_2F_2$
1048.51 grams $H_2O$
Mass Balance Calculation

| HF | 2124.38/2162.5*100 = | 98.24% |
| $UO_2F_2$ | 327.15/343.8*100 = | 95.16% |
| $H_2O$ | 1048.51/1085.0*100 = | 96.64% |

TABLE 6-continued

1st Reactor Mass Balance

1st reactor was run with a starting HF solution concentration of 64.73% HF.
The results of the flash distillation of a 65% HF solution saturated with $UO_2F_2$ are as follows:

| Sample | Elapsed Time (min) | Sample Size (gm) | % HF | U conc. |
|---|---|---|---|---|
| 1 | 60 | 11.76 | 66.22 | <1.40 ppm |
| 2 | 75 | 18.86 | 99.50 | <0.36 ppm |
| 3 | 120 | 24.52 | 99.74 | <0.35 ppm |
| 4 | 135 | 12.96 | 98.79 | <2.16 ppm |

The results of the analysis of pump tank vapor samples when UF6 feed was on are as follows:

| Sample | Sample Size (gm) | $UF_6$ Rate (g/min) | % HF | U conc. |
|---|---|---|---|---|
| 1 | 10.39 | NA | 99.29 | <0.58 ppm |
| 2 | 12.77 | 3.5 | 98.71 | <0.14 ppm |
| 3 | 3.90 | 1.4 | 93.07 | <240 ppm |
| 4 | 13.32 | 4.8 | 99.15 | <11 ppm |

TABLE 7

Distillation Results/Data

A distillation column was constructed consisting of a reboiler, 16" L x 1" OD column packed with Kynar mesh packing, and a tube in tube condenser. The theoretical plates were calculated to be 10.6. 0.0958 grams of $UO_2F_2$ were added to 1481.6 grams of 64.73% HF solution to make a 50 ppm uranium
concentration reboiler charge.
Samples were taken periodically and analysed for both HF and uranium concentration until the 1 ppm uranium spec (set as an experimental goal) was satisfied. Results/data are as follows:

| Sample | Elapsed Time (min) | Sample Size (gm) | % HF | U conc. |
|---|---|---|---|---|
| 1 | 75 min | 35.05 | 99.10 | <54 ppm |
| 2 | 174 min | 32.43 | 99.25 | <8 ppm |
| 3 | 206 min | 32.24 | 99.70 | <1.6 ppm |
| 4 | 248 min | 32.1 | 99.00 | <0.8 ppm |

TABLE 7-continued

Distillation Results/Data

| Elapsed Time (min) | Reboiler Temp ° C. | Top Column Temp ° C. | Reflux Temp ° C. | System Pressure psig | Cooling in Temp ° C. | Splitter Set Time seconds closed/open | Comments |
| --- | --- | --- | --- | --- | --- | --- | --- |
| 0 | 79.1 | 44 | 35 | 0 | −16.5 | | reflux visible |
| 9 | 81.3 | 44 | 40 | 0 | −16.4 | | |
| 44 | 84.1 | 23 | 23 | 0 | −11.5 | | |
| 77 | 82.9 | 21 | 22 | 0 | −18.8 | 6/2 | start sample 1 |
| 166 | 86 | 19 | 20 | 0 | −16.4 | 6/1 | start sample 2 |
| 176 | 84.6 | 17 | 18 | 0 | −16.7 | 6/1 | end sample 1 |
| 196 | 90 | 21 | 22 | 0 | −17.7 | 8/1 | start sample 3 |
| 215 | 90.5 | 21 | 22 | 0 | −17.1 | 8/1 | end sample 3 |
| 240 | 94.5 | 23 | 24 | 0 | −16.7 | 15/1 | start sample 4 |

From the Examples, it is apparent that the method of the invention provides a complete process that can run at low temperatures and pressures so that less expensive materials can be used to produce the apparatus.

While the particular process for recovery of anhydrous hydrogen fluoride and uranium oxide products from depleted, natural or enriched uranium hexafluoride as herein shown and disclosed in detail is fully capable of obtaining the objects and providing the advantages herein before stated, it is to be understood that it is merely illustrative of the presently preferred embodiments of the invention and that no limitations are intended to the details of operation herein shown other than as described in the appended claims.

What is claimed is:

1. A method for recovering anhydrous hydrogen fluoride and a uranium oxide product from uranium hexafluoride comprising the steps of:

(a) reacting said uranium hexafluoride in a first reactor by contact with a liquid solution comprised of hydrogen fluoride and water to produce an uranyl fluoride hydrate intermediate;

(b) reacting said uranyl fluoride hydrate intermediate with a gaseous water feed in a second reactor to produce said uranium oxide products and a mixture comprised of water, hydrogen fluoride and oxygen;

(c) boiling said liquid solution comprised of hydrogen fluoride and water from said first reactor to form a vapor and combining said vapor with said mixture of comprised of water, hydrogen fluoride and oxygen from said second reactor to form a combination;

(d) condensing said combination to form a mixed gas and liquid state, said gas state being comprised of essentially oxygen and said liquid state being comprised of hydrogen fluoride and water; and (e) distilling said mixed gas and liquid state in a separation unit to produce said anhydrous hydrogen fluoride as a distillate and a liquid stream of hydrogen fluoride and water azeotrope.

2. A method for recovering anhydrous hydrogen fluoride and a uranium oxide product from uranium hexafluoride as stated in claim 1, further comprising the step of:

(f) recycling said liquid stream of hydrogen fluoride and water azeotrope to said first reactor.

3. A method for recovering anhydrous hydrogen fluoride and a uranium oxide product from uranium hexafluoride as stated in claim 2, further comprising the step of:

(g) recycling a part of said liquid stream of HF and water azeotrope to said second reactor in place of or as a supplement to said gaseous water feed.

4. A method for recovering anhydrous hydrogen fluoride and a uranium oxide product from uranium hexafluoride as stated in claim 1, wherein said liquid solution of HF and water is comprised of from 37 weight % to 65 weight % HF.

5. A method for recovering anhydrous hydrogen fluoride and a uranium oxide product from uranium hexafluoride as stated in claim 1, wherein said pressure in said first reactor ranges from 1 psig to 5 psig.

6. A method for recovering anhydrous hydrogen fluoride and a uranium oxide product from uranium hexafluoride as stated in claim 1, wherein said temperature in said first reactor of said liquid solution of HF and water ranges from 76° C. to 115° C.

7. A method for recovering anhydrous hydrogen fluoride and a uranium oxide product from uranium hexafluoride as stated in claim 1, wherein said temperature in said second reactor ranges from 427° C. to 704° C.

8. A method for recovering anhydrous hydrogen fluoride and a uranium oxide product from uranium hexafluoride as stated in claim 1, wherein said temperature in said second reactor preferably ranges from 538° C. to 649° C.

9. A method for recovering anhydrous hydrogen fluoride and a uranium oxide product from uranium hexafluoride as stated in claim 1, wherein said pressure in said second reactor ranges from 1 psig to 5 psig.

10. A method for recovering anhydrous hydrogen fluoride and a uranium oxide product from uranium hexafluoride as stated in claim 1, wherein said pressure in said separation unit is less than 5 psig.

11. A method for recovering anhydrous hydrogen fluoride and a uranium oxide product from uranium hexafluoride as stated in claim 1, wherein said uranium oxide product is triuranium octoxide.

12. A method for recovering anhydrous hydrogen fluoride and a uranium oxide product from uranium hexafluoride as stated in claim 1, wherein said uranium oxide product is uranium trioxide or uranium dioxide.

13. A method for recovering anhydrous hydrogen fluoride and a uranium oxide product from uranium hexafluoride as stated in claim 1, where said uranium hexafluoride is supplied from depleted, natural, or enriched uranium hexafluoride.

* * * * *